United States Patent
Ogawa et al.

(10) Patent No.: US 6,993,625 B2
(45) Date of Patent: Jan. 31, 2006

(54) LOAD BALANCING STORAGE SYSTEM

(75) Inventors: Hideo Ogawa, Odawara (JP); Akira Yamanashi, Tokyo (JP); Kenichi Tateyama, Odawara (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 10/706,913

(22) Filed: Nov. 14, 2003

(65) Prior Publication Data

US 2004/0098524 A1 May 20, 2004

Related U.S. Application Data

(63) Continuation of application No. 09/836,458, filed on Apr. 18, 2001, now Pat. No. 6,763,438.

(30) Foreign Application Priority Data

Apr. 18, 2000 (JP) .................................. 2000-122373

(51) Int. Cl.
*G06F 12/00* (2006.01)

(52) U.S. Cl. .................. 711/114; 711/112; 711/157; 714/8; 710/104

(58) Field of Classification Search .......... 711/114, 711/112, 157; 714/8; 710/104
See application file for complete search history.

(56) References Cited

U.S. PATENT DOCUMENTS

| | | | |
|---|---|---|---|
| 5,694,615 A | * 12/1997 | Thapar et al. | 710/2 |
| 5,768,623 A | 6/1998 | Judd et al. | 710/37 |
| 5,898,828 A | 4/1999 | Pignolet et al. | 714/6 |
| 6,055,228 A | * 4/2000 | DeKoning et al. | 370/258 |
| 6,108,684 A | 8/2000 | DeKoning et al. | 709/105 |
| 6,145,006 A | 11/2000 | Vishilitsky et al. | 709/229 |
| 6,192,027 B1 | 2/2001 | El-Batal | 370/222 |
| 6,397,267 B1 | 5/2002 | Chong, Jr. | 710/1 |
| 6,480,934 B1 | 11/2002 | Hino et al. | 711/114 |

FOREIGN PATENT DOCUMENTS

JP        11338646        12/1999

OTHER PUBLICATIONS

Jurgens, "Fibre Channel: A Connection to the Future", Computer, IEEE, pp. 88–90, Aug. 1995.

* cited by examiner

*Primary Examiner*—Stephen Elmore
(74) *Attorney, Agent, or Firm*—Mattingly, Stanger, Malur & Brundidge, P.C.

(57) ABSTRACT

A disk storage subsystem allocating an equivalent number of hard disk drives to each loop, alternately connecting the connecting bays of hard disk drives to optical fiber channels provided with two or more fiber channel loops for optimizing load balancing.

27 Claims, 7 Drawing Sheets

LOAD BALANCING STORAGE SYSTEM

The present application is a continuation of application Ser. No. 09/836,458, filed Apr. 18, 2001, now U.S. Pat. No. 6,763,438, the contents of which are incorporated herein by reference.

BACKGROUND OF THE INVENTION

The present invention relates to a storage system operating in communication with a host unit; and, more particularly, the invention relates to the connecting configuration of recording media having the structure of a loop connecting plural recording media.

Recently, with the increased interest in the concept of a Storage Area Network (SAN), the loop connection using an optical fiber channel is rapidly being adopted as an interface to connect a host unit with various devices. The structure of the connections between components inside a disk array unit, which does not use a bus connection, but uses a loop connection having a fiber optic channel, is becoming popular (for example, a loop connection between a controller and recording media using a fiber optic channel). For instance, Japanese patent publication No. Kokai 11-338646 discloses a disk array unit which does not use a bus, but the switching network structure for the connection between components.

SUMMARY OF THE INVENTION

The above-described patent publication is directed to the connection between the components with a single network. In a storage system connecting components with plural loops, such as this network, the following considerations will be important for mounting and setting up the recording media.

1. In case the storage system is a disk array system, the data from the host unit is distributed, generated and relocated to the data by the Redundant Array of Inexpensive (Independent) Disks (RAID) method. The data from the host unit is also recorded dispersedly into plural recording media which are set as a RAID group. Therefore, it is important to optimize the access paths and the load balancing to each recording medium. 2. There are plural loops of the recording media. Therefore, it is important to optimize the access path and the load balancing to these loops.

However, the above-described patent publication discloses nothing about the optimization of the access paths and the load balancing in connecting the recording media with multipath loops for the recording media.

As a method of load balancing optimally, it is desirable to mount the recording media at an optimum location, considering the loop for the recording medium, at the time of mounting the recording medium. In addition, at the time of forming a RAID group with the mounted recording media, it is desirable to select the recording media connected to the optimum loop for the recording media in order to build the RAID group. However, the selection of the mounting location or the selection of the recording media while taking into consideration the problem of load balancing is difficult for a person other than those who are familiar with the internal structure of the controller, such as the connecting location of the loop. Even when an operator who is in charge of the mounting and the setting executes such operation, there is a high possibility that such person will fail in distributing the recording media with a uniform load.

The object of the present invention is to provide a recording media mounting system that enables the adequate setting of access paths and load balancing without specifically considering the mounting location.

As a configuration to attain the above-described object, the storage system of the present invention consists of two or more recording media storing data received from a host unit, a controller controlling the data transfer between the recording media and the host unit, and plural loops, located between the controller and the recording media, connecting the different recording media. A recording medium is connected to an adjacent different loop than that of another recording medium, and the number of the recording media connected to each loop can be equalized by simply connecting the recording media to successive loops in turn.

DETAILED DESCRIPTION OF THE INVENTION

A preferred embodiment of the present invention will be described with reference to the drawings.

Figure 1:
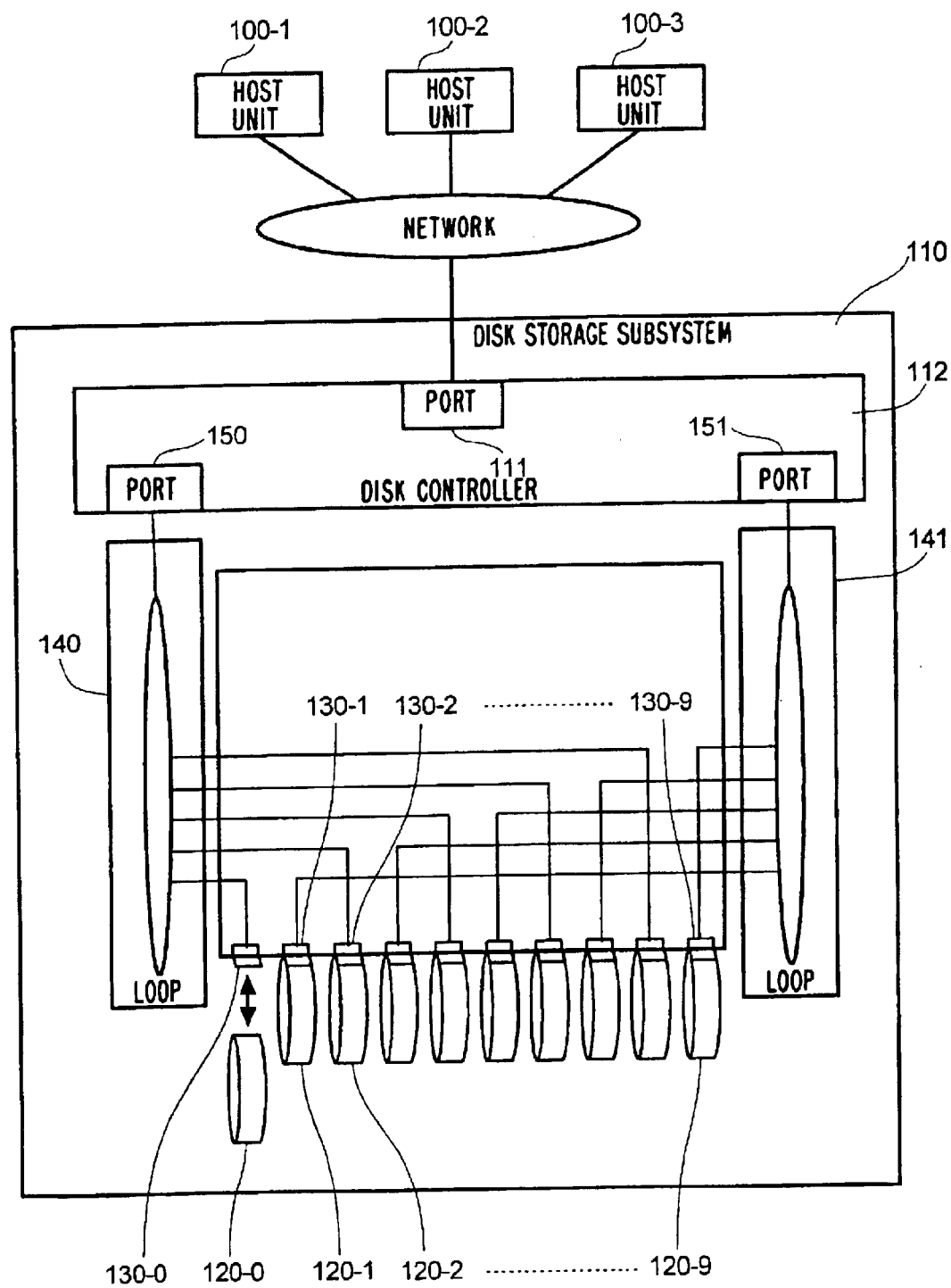
FIG. 1 is a block diagram of the total structure of the present invention.

FIG. 1 is an example of a configuration of the storage system, which uses hard disk-drives as the recording medium, in accordance with an embodiment of the present invention. Hereafter, in a disk array system where both the connections with a host unit and the connections with a group of recording media are optical fiber channel connections, a loop for performing communication and data transfer by connecting the controller with the group of recording media will be referred to as a back-end loop, and a loop for connecting with a host unit(s) will be referred to as a front-end loop for purposes of description.

In FIG. 1, a disk controller 112 is provided with a port 111, which is an interface to connect the disk controller with host units 100-1, 100-2 and 100-3, that operate as host units or central processing units, through a Storage Area Network (SAN), and ports 150 and 151, that serve as interfaces to connect the disk controller 112 to back-end loops 140 and 141, respectively, through which the disk controller is connected with the hard disk drives 120 that operate as the recording media.

The disk controller 112 controls the transfer of data written from the host units 100 to the hard disk drives 120, or the transfer of data read from the hard disk drives 120 to the host units 100. In a word, the disk controller 112 controls the whole disk storage subsystem 110.

This disk storage subsystem 110 consists of the hard disk drives 120-0 through 120-9; connecting bays 130-0 through 130-9, which function as connectors connecting the hard disk drives detachably with the back-end loops that are formed by the optical fiber channels; the back-end loops 140 and 141, which connect the hard disk drives to the disk controller; and the disk controller 112 itself for controlling the hard disk drives. The back-end loops-140 and 141 are electrically connected through the connecting bays 130-0 through 130-9 with the hard disk drives 120-0 through 120-9. It is possible to connect the hard disk drives 120-0 through 120-9 to the connecting bays 130-0 through 130-9 independently, and it is not necessary to mount connecting drives in all of the connecting bays.

The disk storage subsystem 110 uses the loop interfaces of the optical fiber channels for all connections of the back-end loops 140 and 141, the connecting bays 130-0 through 130-9, the hard disk drives 120-0 through 120-9, and the interfaces 150 and –151. It is needless to say that the back-end loops 140 and 141, that operate as communication paths, are not limited to optical fiber channels.

Figure 3:
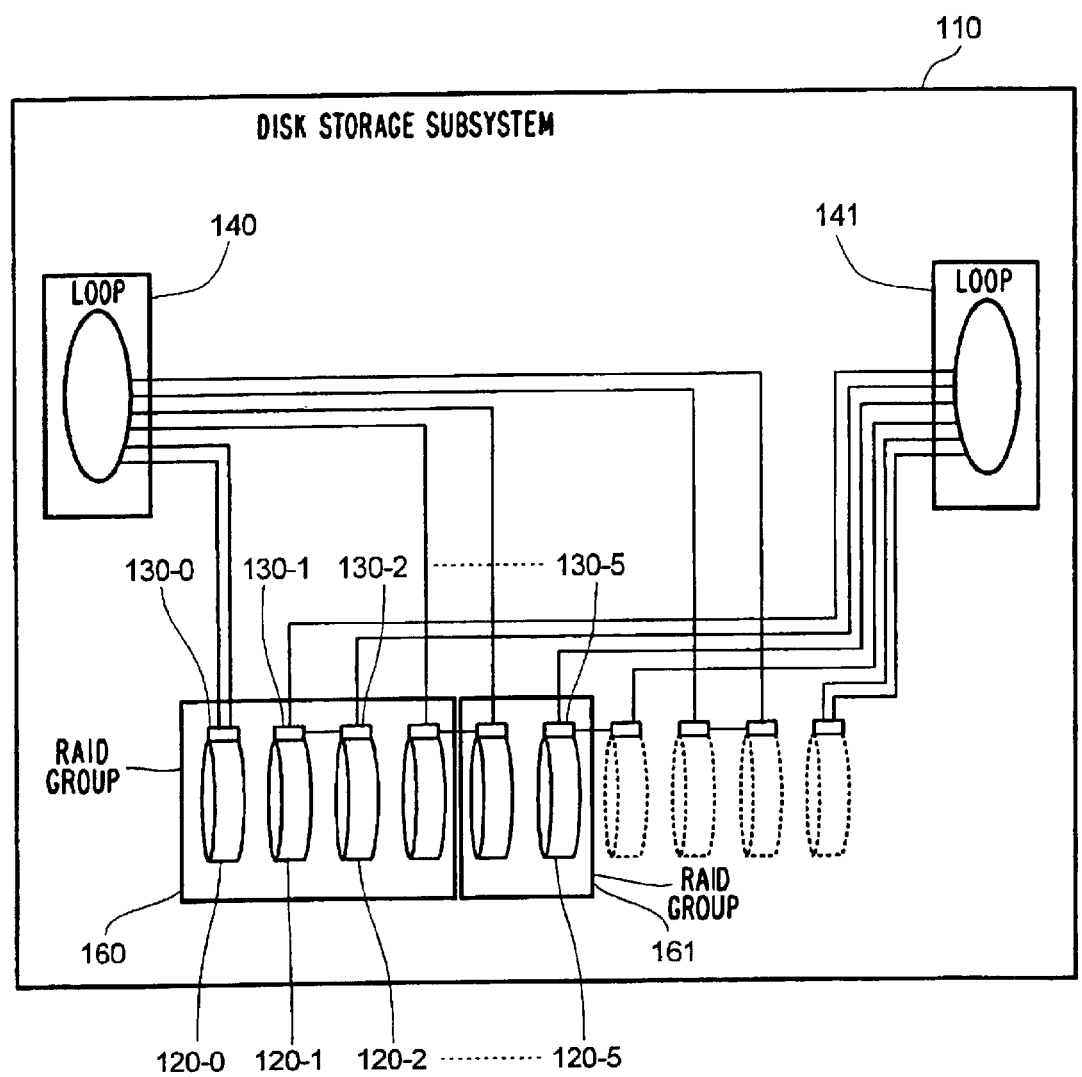
FIG. 3 is a schematic diagram illustrating an example of the connection of hard disk drives with-loops.

The back-end loop is illustrated in the figure as an ellipse and with the respective lines from the ellipse extending to respective ones of the connecting bays 130. In the figure, though each connection is shown by a line for ease of description, the connection from the ellipse to the connecting bay 130 also forms a loop which is electrically detachable with respect to the loop indicated by the ellipse. In the following description, each of the loops is shown by one line, except for the loops in FIG. 3. FIG. 3 shows the loop as a pair of lines.

Here, the port 150 is connected with the back-end loop 140, and the port 151 is connected with the back-end loop 141. The connecting bays 130-0, 130-2, 130-4, 130-6 and 130-8 are connected with the back-end loop 140, and the connecting bays 130-1, 130-3, 130-5, 130-7 and 130-9 are connected with the back-end loop 141. The mounting position of each connecting bay alternately connected with each back-end loop is, for example, mounted from the left side sequentially in the order of the consecutive connecting bay number, as shown in the figure. Therefore, in case of mounting the hard disk drives 120 to each connecting bay, regardless of the number of hard disk drives, it is easy to alternately allocate the hard disk drives 120 to the back-end loops 140 and 141 by mounting the hard disk drives 120 in the ascending order from the location of the connecting bay 130-0 or by mounting the hard disk drives 120 in the descending order from the location of the connecting bay 130-9. Therefore, the number of hard disk drives connected to each back-end loop can be shared equally. Connecting the hard disk drives 120 to each of the back-end loops 140 and 141 alternately is a method which results in optimal distribution of the load to the throughput of the back-end loop.

Figure 2:
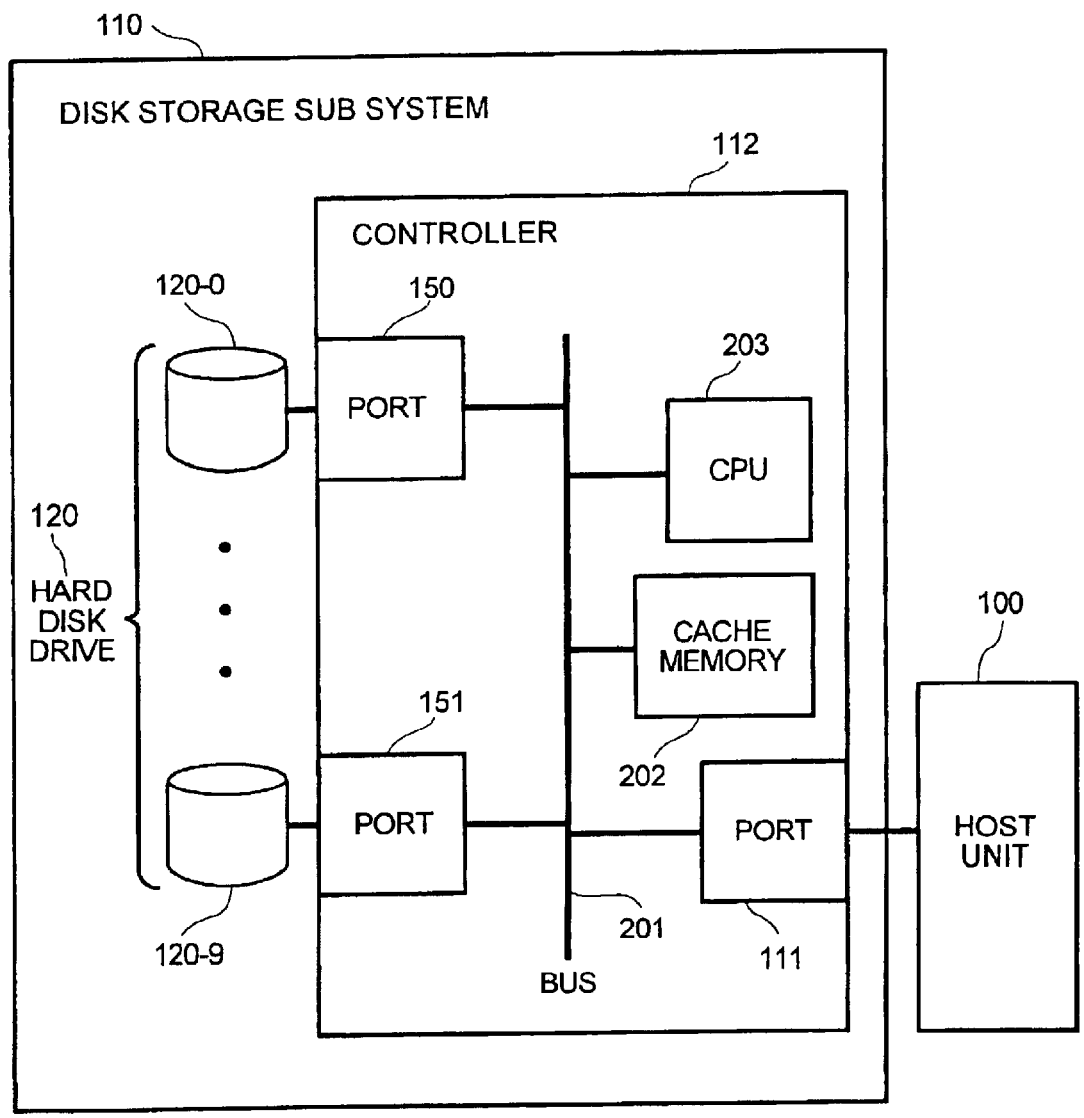
FIG. 2 is a block diagram of the configuration inside a disk controller.

FIG. 2 shows the outline of the controller 112 of the disk storage subsystem 110. The controller 112 comprises a port 111 connected in communication with a host unit 100 to control protocol processing and data transfer with the host unit 100; ports 150 and 151 connected to the hard disk drive group 120 to control protocol processing and data transfer with the hard disk drive 120; a cache memory 202 for storing the transferred data temporarily; the CPU 203 that operate as a processor for controlling each of these elements and the entire disk controller 112; and a bus 201 which provides data transfer between the ports and the cache memory and command transfer between the ports and the CPU.

When the CPU 203 of the disk storage subsystem 110 receives a data write instruction from the host unit 100, the CPU 203 temporarily stores the data sent from the host unit 100 via the port 111 in the cache memory 202 through the bus 201. The CPU 203 reports the end of the write operation to the host unit when the CPU 203 completes the storage of the data in the cache memory 202. Then, the processor in the port 150 or 151 writes the data stored in the cache memory 202 into the hard disk drive group 120 while being controlled with RAID technology.

When the CPU receives the data read instruction from the host unit 100, the CPU refers to the information managing the cache memory and decides whether the instructed data is stored in the cache memory 202. If the instructed data is stored in the cache memory 202, the CPU transfers the data to the host unit 100 through the port 111. If the data is not stored in the cache memory 202, the CPU copies the data from the hard disk drives 120 to the cache memory 202, and then transfers the data from the cache memory 202 to the host unit 100 via the port 111.

For ease of description, an example of a single host unit 100 is shown; however, it is possible to connect the port 111 to the SAN as shown in FIG. 1, and it is also possible to connect the ports 111 to two or more host units provided with two or more ports 111. The disk controller 112 can be not only bus connected, but it can also connect the cache memory to each interface through an independent path.

Next, with reference to FIG. 3, a system comprising two RAID groups 160 and 161 will be explained, one of which is assigned four hard disk drives and the other of which is assigned two hard disk drives.

First, the mounting method will be explained. In a disk storage subsystem 110 shown in FIG. 3, the connecting bays 130-0, 130-3, 130-4, 130-7 and 130-8 are connected to the back-end loop 140, and the connecting bays 130-1, 130-2, 130-5, 130-6 and 130-9 are connected to the back-end loop 141. Forming pairs of hard disk drives 120, except for other parts, can decrease the number of loops from the back-end loop to the connecting bay.

With such a configuration of the loops and the connecting bays, mounting the hard disk drives 120 from the connecting bay 130-0 in the ascending order or from the connecting bay 130-9 in the descending order allows the fiber channel loops 140 and 141 to have the same number of the hard disk drives 120, when the total number is even, and to have the numbers of the hard disk drives 120 different by one drive, when the total number is odd. The load is balanced among the back-end loops. It is needless to say that the configuration of pairs of the hard disk drives 120, including the other parts, can provide an effectively balanced load.

Similarly to FIG. 1, the load can be balanced with the connection of the connecting bays 130-0, 130-2, 130-4, 130-6 and 130-8 to the back-end loop 140 and the connection of the connecting bays 130-1, 130-3, 130-5, 130-7 and 130-9 to the back-end loop 141.

Next, the configuration of the RAID groups 160 and 161, will be described. Four hard disk drives required by the RAID group 160 are allocated from the connecting bay 130-0 in the ascending order. Here, the hard disk drives are allocated alternately to the back-end loops 140 and 141, respectively. Similarly, a pair of required hard disk drives are allocated from the connecting bay 130-4 in the ascending order to the RAID group 161, and then the load is balanced among the back-end loops.

In this preferred embodiment of the present invention, a simple operation of allocating the required number of the hard disk drives from the connecting bay 130-0 in the ascending order can realize a mounting of the hard disk drives and a load balancing among the back-end loops of the hard disk drives inside the RAID group.

Figure 4:
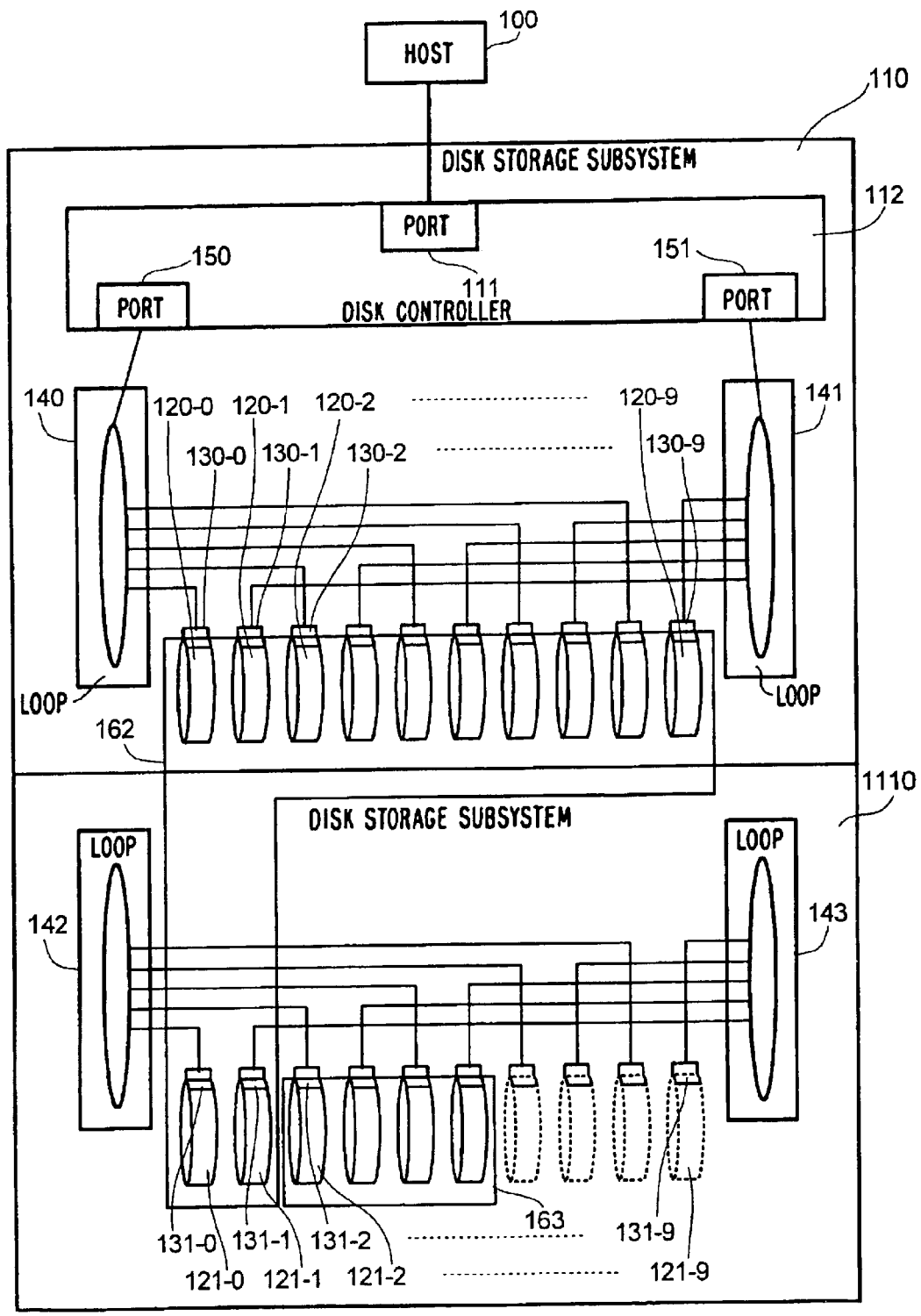
FIG. 4 is a schematic diagram illustrating an example of the connection of hard disk drives with loops.

Next, the preferred embodiment of the expansion of the back-end loops, the connecting bays, and the hard disk drives will be explained with reference to FIG. 4. The components of the disk storage subsystem 110 are the components used in FIG. 1 and the disk storage subsystem 110 is connected with an extension unit 1110 containing back-end loops 142 and 143, connecting bays 131-0 through 131-9, and hard disk drives 121-0 through 121-9. The extension unit 1110 is connected with the disk storage subsystem 110 through the connection of the back-end loop 142 with the back-end loop 140 and the back-end loop 143 with the back-end loop 141. For the ease of description, the figure shows the connection between the back-end loop in the disk storage subsystem 110 and the back-end loop in the extension unit 1110 as the connection of a single line; however, another loop is formed with the back-end loop in the disk storage subsystem 110 and the back-end loop in the extension unit 1110.

In this case, the back-end loop and the connecting bay are connected as follows: the connecting bays 131-0, 131-2, 131-4, 131-6 and 131-8 connect to the back-end loop 142, and the connecting bays 131-1, 131-3, 131-5, 131-7 and 131-9 connect to the back-end loop 143. In this case, the above-described connection makes it possible to count or set up the hard disk drives 120 to each connecting bay.

The following describes an example of a configuration of two RAID groups. One RAID group is allocated with twelve of the hard disk drives 120 and the other RAID group is allocated with four of the hard disk drives 120.

The RAID group is mounted with the necessary twelve hard disk drives from the connection bay 130-0 in the ascending order. In a case where the hard disk drives 120 cannot be connected due to the failure of the connecting bay 130-0 or some other reason, the mounting of the hard disk drives 120 does not have to start from the connecting bay 130-0, but it can start from any other of the connecting bays 130 sequentially. The following describes the configuration of the RAID groups 162 and 163. The twelve hard disk drives 120 used for the RAID group 162 are sequentially allocated from the connecting bay 130-0 or any mounted connecting bay.

The sequential allocation from the connecting bays allocates the hard disk drives 120 alternately to the connected group of the back-end loops 140 and 142 and the connected group of the back-end loops 141 and 143; therefore, the load can be balanced between the back-end loops. As in the case of the RAID group 162, the RAID group 163 can be allocated with the four necessary hard disk drives 120 from the connecting bay 131-2 sequentially to balance the load between the back-end loops. In this preferred embodiment of the present invention, a simple rule of sequentially allocating the necessary number of hard disk drives 120 from the connecting bay 130 can realize a mounting of a hard disk drives 120 and the load balancing among the loops of the hard disk drives inside the RAID group.

Figure 5:
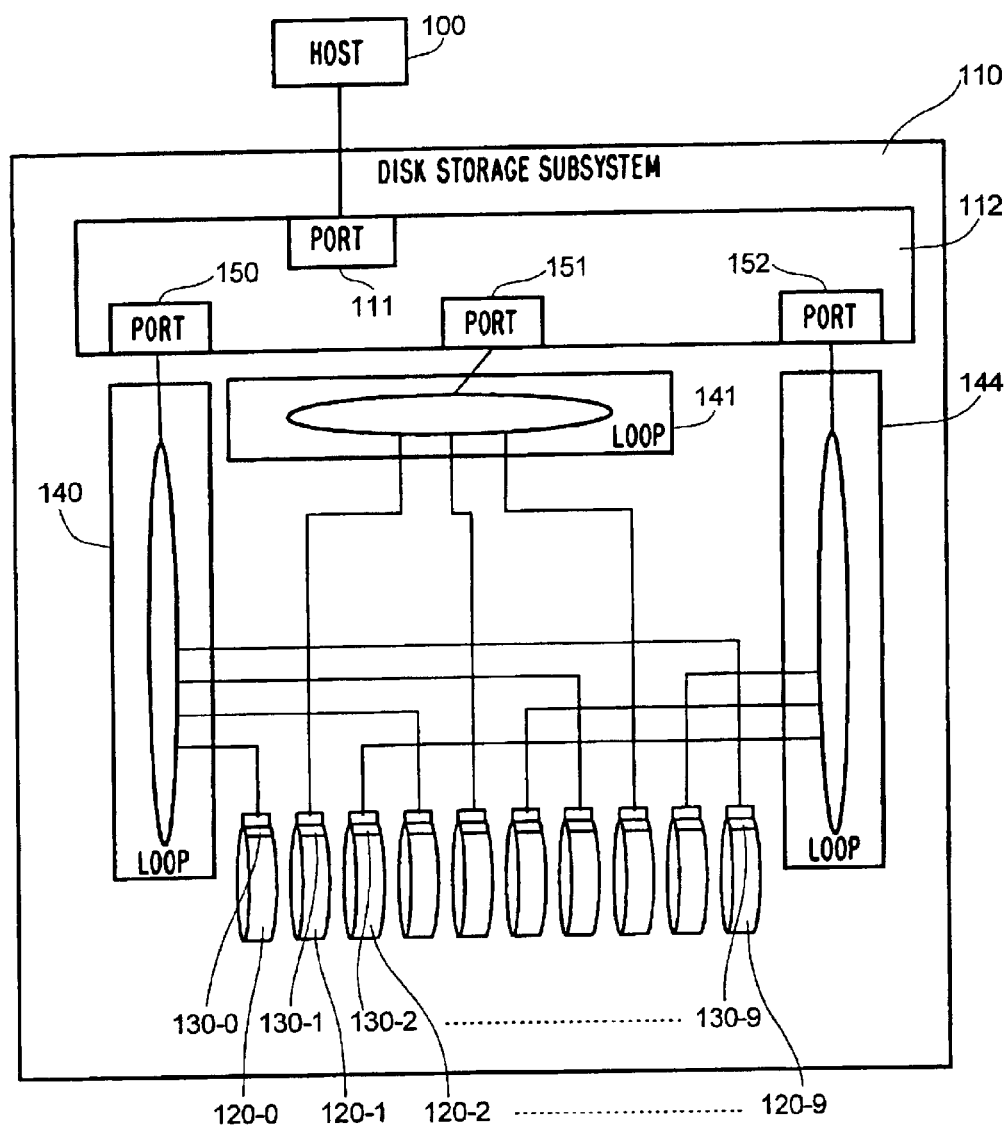
FIG. 5 is a schematic diagram illustrating an example of the connection of hard disk drives with loops.

FIG. 5 shows the preferred embodiment of the present invention for a disk storage subsystem provided with three back-end loops. The components of the disk storage subsystem 110 are similar to the components of the disk storage subsystem used in FIG. 1. The main difference from the preferred embodiment of FIG. 1 is that there are three systems in the connection between ports and back-end loops, and between back-end loops and connecting bays. Each of the ports 150, 151 and 152 is connected with the back-end loops 140, 141 and 144, respectively, the back-end loop 140 is connected with the connecting bays 130-0, 130-3, 130-6 and 130-9, the back-end loop 141 is connected with the connecting bays 130-1, 130-4 and 130-7 and the back-end loop 144 is connected with the connecting bays 130-2, 130-5 and 130-8.

Mounting the hard disk drives 120 to each of the connecting bays 130 connects the adjacent hard disk drives 120 to a different back-end loop and port. In this preferred embodiment, the theory of the load balancing is similar to the case of the two back-end loops. Three back-end loops will reduce the amount of the load per one back-end loop as compared with two back-end loops.

Figure 6:
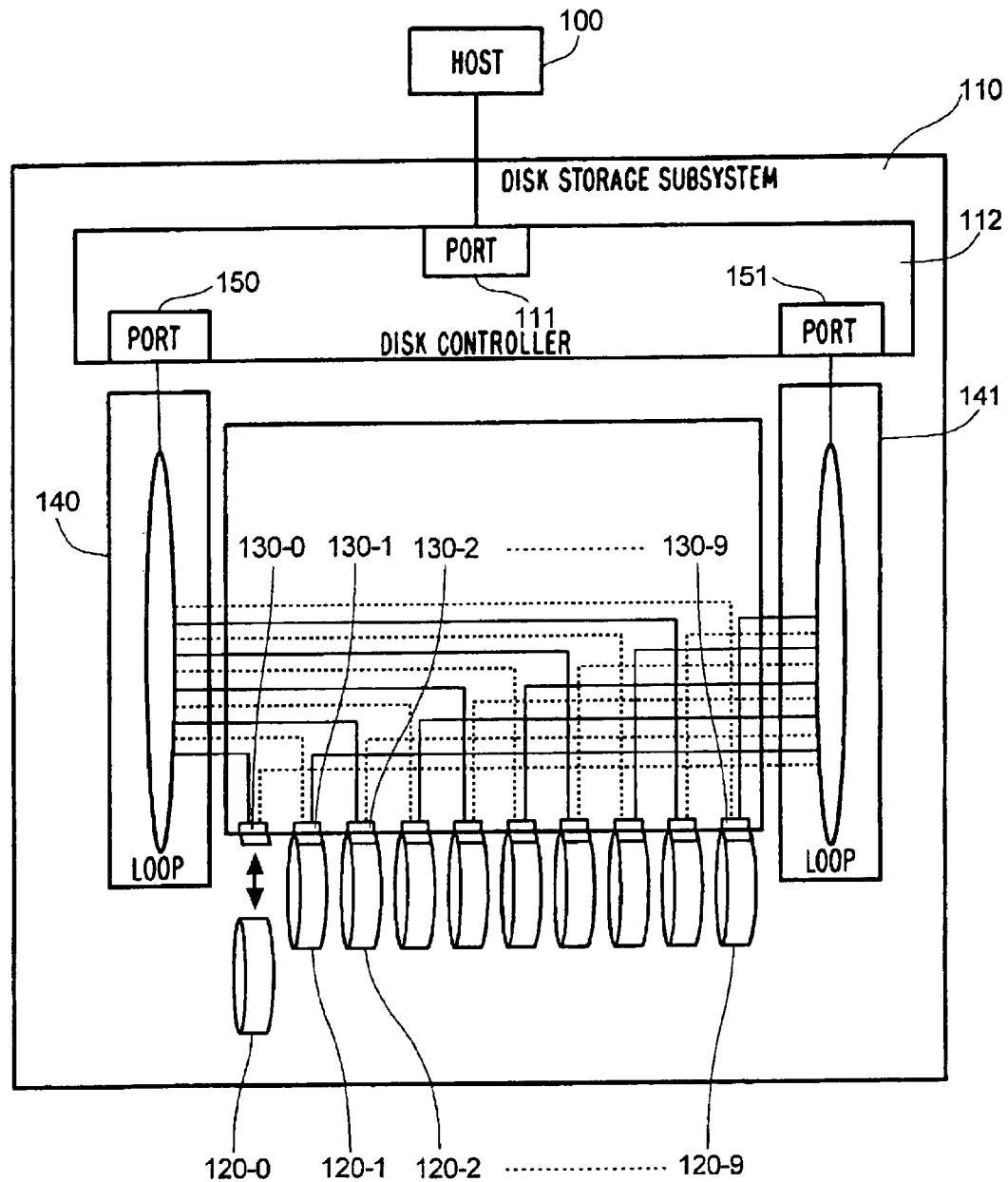
FIG. 6 is a schematic diagram illustrating an example of the connection of the loops with a multiplicity of disk drives.

FIG. 6 shows an example of a storage system provided with plural controllers and loops. The data is generally transferred between the back-end loop 140 or 141 and each of the connecting bays 130 through the optical fiber channel shown with a solid line in FIG. 6. That is, the data transfer under normal condition is as in the case of FIG. 1. In a case where a failure has occurred in the optical fiber channel between the back-end loop and each of the connecting bays 130, the data is transferred through the optical fiber channel shown with a dotted line using a different back-end loop from the normal one.

To be more specific, the normal connection route for the hard disk drive 120-1 is from the host unit 100 through the port 111 and the port 151 and via the back-end loop 141 to the connecting bay 130-1; however, in case of a failure between the back-end loop 141 and the connecting bay 130-1, the connection route for the hard disk drive 120-1 will be changed to another route from the host unit 100 through the port 111, the port 150, and the back-end loop 140 to the connecting bay 130-1, so that the data can be transferred without giving the user any reduction of the failure.

In case of a failure in one port or in one back-end loop, the other port and the other back-end loop make data transfer possible between the host unit 100 and the hard disk drive 120.

Though the above-described preferred embodiments of the present invention have been explained with reference to a hard disk drive as a recording medium, the recording medium can be an optical disk or a magneto-optical disk, or can be either of a tape unit or a card type memory, such as a flash memory.

Figure 7:
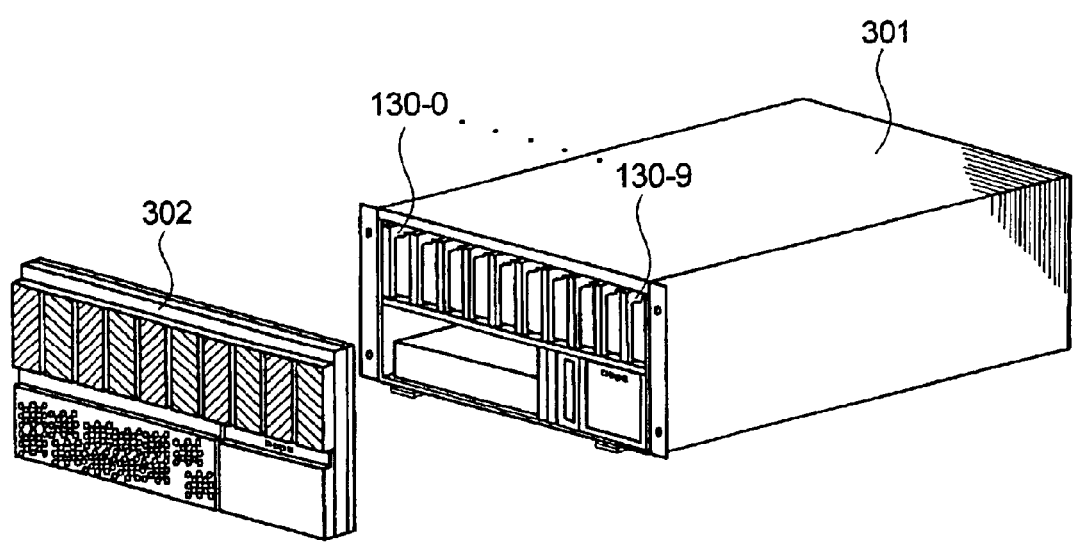
FIG. 7 is a perspective view of a disk storage subsystem with the front panel removed.

The above-described disk storage subsystem 110 has, for instance, the external appearance as shown in FIG. 7. The disk storage subsystem 110 has a rectangular frame 301, a front panel 302 with ventilating holes, which is located in front of the disk storage subsystem 110 and covers the front surface, and the connecting bays 130-0 through 130-9 which are arranged in numerical order to mount the hard disk drives 120 on the upper side of the front panel 302. Mounting into these connecting bays 130 allows the hard disk drives to be located in a row consisting of ten independent drives in sequence from 120-0 through 120-9.

The extension unit 1110 explained with reference to FIG. 4 has a shape for accommodating the connecting bays 131 for mounting the hard disk drives 121 on the upper side of the frame 301, and the back-end loop on the disk array unit 110 can be connected with the back-end loop on the extension unit 1110 on the rear panel shown in FIG. 7.

Therefore, the hard disk drives can be easily expanded by stacking the extension unit 1110 and the disk storage subsystem 110. In stacking the units, it is possible to mount the disk storage subsystem 110 and the extension unit 1110 into a rack, or to cover the disk storage subsystem 110 and the extension units 1110 with a frame having a size according to the number of the hard disk drives the user desires.

According to the present invention, as described above, in the disk storage subsystem provided with two or more back-end loops for connecting the hard disk drives, the load balancing in each loop and the setting work for mounting can be facilitated by connecting the back-end loops to the connecting bays which mount the hard disk drives with an adequate pattern so that the connecting bays conform to the mounting order of the hard disk drives.

What is claimed is:

1. A disk storage system comprising:

a first plurality of disk drives storing data;

a second plurality of disk drives storing data;

a first loop used to transfer data to said first disk drives;

a second loop used to transfer data to said disk drives;

a first plurality of communicating lines coupling said first loop with said first disk drives and coupling said first loop with said second disk drives;

a second plurality of communicating lines coupling said second loop with said first disk drives and coupling said second loop with said second disk drives;

a first plurality of connecting parts coupling said first communication lines and said second communication lines with said first disk drives;

a second plurality of connecting parts coupling said first communicating lines and said second communicating lines with said second disk drives;

a disk controller comprising:

a first disk communicating port coupled to said first loop, and communicating with said first disk drives via said first loop, a second disk communicating port coupled to said second loop, and communicating with said second disk drives via said second loop, a host communicating port communicating with a host unit, a cache memory storing data, which is communicated between said host communication port and said first and second disk communicating ports, and a processor controlling said host communicating port, said first disk communicating port, said second disk communicating port and said cache memory.

2. A disk storage system according to claim 1, wherein each of the first plurality of connecting parts connecting each of the first and the second plurality of communicating lines with each of the first plurality of disk drives, and each of the second plurality of connecting parts connecting each of the first and the second plurality of communicating lines with each of the second plurality of disk drives.

3. A disk storage system according to claim 2, wherein each of the first plurality of communicating lines corresponding to the first plurality of disk drives are a normal communication route, and each of the second plurality of communicating lines corresponding to the first plurality of disk drives are communication route in case of a failure of each of the first plurality of communicating lines.

4. A disk storage system according to claim 3, wherein each of the first plurality of communicating lines corresponding to the first plurality of disk drives are a normal communication route, and each of the second plurality of communicating lines corresponding to the first plurality of disk drives are communication route in case of a failure of the first loop.

5. A disk storage system according to claim 4, wherein communication is performed from each of the first plurality of communicating lines to each of the first plurality of disk drives via each of the first plurality of connecting parts when no failure has occurred, however communication is switched from some of the first plurality of communicating lines to some of the second plurality of communicating lines when a failure has occurred in some of the first plurality of communicating lines, and communication is performed from some of the second plurality of communicating lines to some of the first plurality of disk drives via some of the first plurality of connecting parts.

6. A disk storage system according to claim 5, wherein communication is performed from each of the first plurality of communicating lines to each of the first plurality of disk drives via each of the first plurality of connecting part when no failure has occurred however communication is switched from some of the first plurality of communicating lines to some of the second plurality of communicating lines when a failure has occurred in the first loop, and communication is performed from some of the second plurality of communicating lines to some of the first plurality of disk drives via some of the first plurality of connecting parts.

7. A disk storage system according to claim 6, wherein each of the second plurality of communicating lines corresponding to the second plurality of disk drives are a normal communication route, and each of the first plurality of communicating lines corresponding to the second plurality of disk drives are communication route in case of a failure of each of the second plurality of communicating lines.

8. A disk storage system according to claim 7, wherein each of the second plurality of communicating lines corresponding to the second plurality of disk drives are a normal communication route, and each of the first plurality of communicating lines corresponding to the second plurality of disk drives are communication route in case of a failure of the second loop.

9. A disk storage system according to claim 8, wherein communication is performed from each of the second plurality of communicating lines to each of the second plurality of disk drives via each of the second plurality of connecting parts when no failure has occurred, however communication is switched from some of the second plurality of communicating lines to some of the first plurality of communicating lines when a failure has occurred in some of the second plurality of communicating lines, and communication is performed from some of the first plurality of communicating lines to some of the second plurality of disk drives via some of the second plurality of connecting parts.

10. A disk storage system according to claim 9, wherein communication is performed from each of the second plurality of communicating lines to each of the second plurality of disk drives via each of the second plurality of connecting parts when no failure has occurred, however communication is switched from some of the second plurality of communicating lines to some of the first plurality of communicating lines when a failure has occurred in the second loop, and communication is performed from some of the first plurality of communicating lines to some of the second plurality of disk drives via some of the second plurality of connecting parts.

11. A disk storage system according to claim 1, wherein some of the first plurality of connecting parts connect one of the first plurality of communicating lines, and some of the second plurality of connecting parts connect one of the second plurality of communicating lines.

12. A disk storage system according to claim 11, wherein each of the first plurality of communicating lines corresponding to the first plurality of disk drives are a normal communication route, and each of the second plurality of communicating lines corresponding to the first plurality of disk drives are communication route in case of a failure of each of the first plurality of communicating lines.

13. A disk storage system according to claim 12, wherein each of the first plurality of communicating lines corresponding to the first plurality of disk drives are a normal communication route, and each of the second plurality of communicating lines corresponding to the first plurality of disk drives are communication route in case of a failure of the first loop.

14. A disk storage system according to claim 13, wherein communication is performed from each of the first plurality of communicating lines to each of the first plurality of disk drives via each of the first plurality of connecting parts when no failure has occurred, however communication is switched from some of the first plurality of communicating lines to some of the second plurality of communicating lines when a failure has occurred in some of the first plurality of communicating lines, and communication is performed from some of the second plurality of communicating lines to some of the first plurality of disk drives via some of the first plurality of connecting parts.

15. A disk storage system according to claim 14, wherein communication is performed from each of the first plurality of communicating lines to each of the first plurality of disk drives via each of the first plurality of connecting parts when no failure has occurred, however communication is switched some of the first plurality of communicating lines to some of the second plurality of communicating lines when a failure has occurred in the first loop, and communication is performed from some of the second plurality of communicating lines to some of the first plurality of disk drives via some of the first plurality of connecting parts.

16. A disk storage system according to claim 15, wherein each of the second plurality of communicating lines corresponding to the second plurality of disk drives are a normal communication route, and each of the first plurality of communicating lines corresponding to the second plurality of disk drives are communication route in case of a failure of each of the second plurality of communicating lines.

17. A disk storage system according to claim 16, wherein each of the second plurality of communicating lines corresponding to the second plurality of disk drives are a normal communication route, and each of the first plurality of communicating lines corresponding to the second plurality of disk drives are communication route in case of a failure of the second loop.

18. A disk storage system according to claim 17, wherein communication is performed from each of the second plurality of communicating lines to each of the second plurality of disk drives via each of the second plurality of connecting parts when no failure has occurred, however communication is switched from some of the second plurality of communicating lines to some of the first plurality of communicating lines when a failure has occurred in some of the second plurality of communicating lines, and communication is performed from some of the first plurality of communicating lines to some of the second plurality of disk drives via some of the second plurality of connecting parts.

19. A disk storage system according to claim 18, wherein communication is performed from each of the second plurality of communicating lines to each of the second plurality of disk drives via each of the second plurality of connecting parts when no failure has occurred, however communication is switched from some of the second plurality of communicating lines to some of the first plurality of communicating lines when a failure has occurred in the second loop, and communication is performed from some of the first plurality of communicating lines to some of the second plurality of disk drives via some of the second plurality of connecting parts.

20. A disk storage system according to claim 1, wherein the first plurality of communicating lines corresponding to the first plurality of disk drives are a normal communication route, and some of the second plurality of communicating lines corresponding some of the first plurality of disk drives are communication route in case of a failure of some of the first plurality of communicating lines.

21. A disk storage system according to claim 20, wherein the second plurality of communicating lines corresponding to the second plurality of disk drives are a normal communication route, and some of the first plurality of communicating lines corresponding to some of the second plurality of disk drives are communication route in case of a failure of some of the second plurality of communicating lines.

22. A disk storage system according to claim 1, wherein the first plurality of communicating lines corresponding to the first plurality of disk drives are a normal communication route, and the second plurality of communicating lines corresponding to the first plurality of disk drives are communication route in case of a failure of the first loop.

23. A disk storage system according to claim 22, wherein the second plurality of communicating lines corresponding to the second plurality of disk drives are a normal communication route, and the first plurality of communicating lines corresponding to the second plurality of disk drives are communication route in case of a failure of the second loop.

24. A disk storage system according to claim 1, wherein communication is performed from the first plurality of communicating lines to the first plurality of disk drives via the first plurality of connecting parts when no failure has occurred, however communication is switched from some of the first plurality of communicating lines to some of the second plurality of communicating lines when a failure has occurred in some of the first plurality of communicating lines, and communication is performed from some of the second plurality of communicating lines with to some of the first plurality of disk drives via some of the first plurality of connecting parts.

25. A disk storage system according to claim 24, wherein communication is performed from the second plurality of communicating lines to the second plurality of disk drives via the second plurality of connecting parts when no failure has occurred, however communication is switched from some of the second plurality of communicating lines to some of the first plurality of communicating lines when a failure has occurred in some of the second plurality of communicating lines, and communication is performed from some of the first plurality of communicating lines to some of the second plurality of communicating lines communicate with some of the second plurality of disk drives via some of the second plurality of connecting parts.

26. A disk storage system according to claim 1, wherein communication is performed from the first plurality of communicating lines to the first plurality of disk drives via the first plurality of connecting parts when no failure has occurred, however communication is switched from the first plurality of communicating lines to the second plurality of communicating lines when a failure has occurred in the first loop, and communication is performed from the second plurality of communicating lines to the first plurality of disk drives via the first plurality of connecting parts.

27. A disk storage system according to claim 26, wherein communication is performed from the second plurality of communicating lines to the second plurality of disk drives via the second plurality of connecting parts when no failure has occurred, however communication is switched from the second plurality of communicating lines to the first plurality of communicating lines when a failure has occurred in the second loop, and communication is performed from the first plurality of communicating lines to the second plurality of disk drives via the second plurality of connecting parts.

* * * * *